(12) United States Patent
Ramani-Augustin et al.

(10) Patent No.: US 9,032,159 B2
(45) Date of Patent: May 12, 2015

(54) DATA PREFETCHER WITH COMPLEX STRIDE PREDICTOR

(75) Inventors: Meera Ramani-Augustin, Austin, TX (US); John Michael Greer, Austin, TX (US)

(73) Assignee: Via Technologies, Inc., New Taipei (TW)

( * ) Notice: Subject to any disclaimer, the term of this patent is extended or adjusted under 35 U.S.C. 154(b) by 194 days.

(21) Appl. No.: 13/535,062

(22) Filed: Jun. 27, 2012

(65) Prior Publication Data

US 2014/0006718 A1 Jan. 2, 2014

(51) Int. Cl.
G06F 12/08 (2006.01)

(52) U.S. Cl.
CPC ............ G06F 12/0862 (2013.01); G06F 12/08 (2013.01); G06F 2212/1016 (2013.01); G06F 2212/6024 (2013.01); G06F 2212/6026 (2013.01)

(58) Field of Classification Search
CPC ... G06F 3/0643; G06F 3/0644; G06F 3/0656; G06F 3/0659; G06F 3/0662; G06F 12/08; G06F 2212/1016; G06F 2212/6024
USPC .................................. 711/137, 151
See application file for complete search history.

(56) References Cited

U.S. PATENT DOCUMENTS

| | | | |
|---|---|---|---|
| 6,571,318 B1 | 5/2003 | Sander et al. | |
| 6,976,147 B1 * | 12/2005 | Isaac et al. | 711/205 |
| 7,155,575 B2 | 12/2006 | Krishnaiyer et al. | |
| 7,260,704 B2 | 8/2007 | Cooksey et al. | |
| 7,487,296 B1 | 2/2009 | Iacobovici et al. | |
| 7,548,982 B2 * | 6/2009 | Gu et al. | 709/228 |
| 7,716,332 B1 * | 5/2010 | Topfl et al. | 709/226 |
| 7,831,800 B2 | 11/2010 | Kocev | |
| 8,078,806 B2 * | 12/2011 | Diefendorff | 711/137 |
| 8,244,959 B2 * | 8/2012 | Fusella et al. | 711/103 |
| 8,341,501 B2 * | 12/2012 | Franceschini et al. | 714/774 |
| 8,504,411 B1 * | 8/2013 | Subasic et al. | 705/7.33 |
| 8,676,741 B2 * | 3/2014 | Ulinski et al. | 706/52 |
| 2004/0128618 A1 * | 7/2004 | Datta | 715/513 |
| 2008/0288863 A1 * | 11/2008 | Bohannon | 715/255 |
| 2009/0198909 A1 | 8/2009 | Speight et al. | |
| 2011/0010506 A1 | 1/2011 | Greer et al. | |
| 2011/0145486 A1 * | 6/2011 | Owa et al. | 711/103 |
| 2011/0238920 A1 | 9/2011 | Hooker et al. | |
| 2011/0238922 A1 | 9/2011 | Hooker et al. | |
| 2011/0238923 A1 | 9/2011 | Hooker et al. | |
| 2012/0047317 A1 * | 2/2012 | Yoon et al. | 711/103 |
| 2013/0086302 A1 * | 4/2013 | Tressler et al. | 711/103 |

* cited by examiner

*Primary Examiner* — Arpan P. Savla
*Assistant Examiner* — Mohamed Gebril
(74) *Attorney, Agent, or Firm* — E. Alan Davis; James W. Huffman; Eric W. Cernyar (57) ABSTRACT

A hardware data prefetcher includes a queue of indexed storage elements into which are queued strides associated with a stream of temporally adjacent load requests. Each stride is a difference between cache line offsets of memory addresses of respective adjacent load requests. Hardware logic calculates a current stride between a current load request and a newest previous load request. The hardware logic compares the current stride and a stride M in the queue and compares the newest of the queued strides with a queued stride M+1, which is older than and adjacent to stride M. When the comparisons match, the hardware logic prefetches a cache line whose offset is the sum of the offset of the current load request and a stride M−1. Stride M−1 is newer than and adjacent to stride M in the queue.

24 Claims, 5 Drawing Sheets

CURRENT STRIDE MATCHES STRIDE 3 (M), AND NEWEST PREVIOUS STRIDE MATCHES STRIDE 4 (M+1), SO PREDICT STRIDE 2 (M-1), WHICH HAS A VALUE OF +3

FIG. 6

NO PREDICTION CAN BE MADE BECAUSE THE CURRENT STRIDE DOES NOT MATCH ANY OF STRIDES 1-3

FIG. 7

CURRENT STRIDE MATCHES STRIDE 4 (M), AND NEWEST PREVIOUS STRIDE MATCHES STRIDE 5 (M+1), SO PREDICT STRIDE 3 (M-1), WHICH HAS A VALUE OF +3

FIG. 8

CURRENT STRIDE MATCHES STRIDE 4 (M), NEWEST PREVIOUS STRIDE MATCHES STRIDE 5 (M+1), AND SECOND NEWEST PREVIOUS STRIDE MATCHES STRIDE 6 (M+2), SO PREDICT STRIDE 3 (M-1), WHICH HAS A VALUE OF +4

FIG. 9

CURRENT STRIDE MATCHES STRIDE 5 (M), NEWEST PREVIOUS STRIDE MATCHES STRIDE 6 (M+1), AND SECOND NEWEST PREVIOUS STRIDE MATCHES STRIDE 7 (M+2), SO PREDICT STRIDE 4 (M-1), WHICH HAS A VALUE OF +4

DATA PREFETCHER WITH COMPLEX STRIDE PREDICTOR

FIELD OF THE INVENTION

The present invention relates in general to the field of microprocessors, and particularly to data prefetching therein.

BACKGROUND OF THE INVENTION

The notion of data prefetching in microprocessors is well known. The microprocessor observes the addresses of recent memory requests and attempts to predict which data will be needed in the future and prefetches the predicted data into a cache memory of the microprocessor in order to avoid the relatively long latency associated with an access to system memory required when a cache miss occurs. It is easy to predict data that will be needed in the future from observing a simple sequence of memory accesses. However, programs also access data in patterns that are more complex than a simple sequential pattern. Designing a data prefetcher to predict future-needed data for complex access patterns may require significant power and timing resources, thereby negatively affecting clock cycle lengths and power consumption of modern microprocessors, both of which are important concerns. Therefore, what is needed is an efficient data prefetcher for predicting complex access patterns.

BRIEF SUMMARY OF INVENTION

In one aspect, the present invention provides a hardware data prefetcher. The hardware data prefetcher includes a queue of indexed storage elements into which are queued strides associated with a stream of temporally adjacent load requests from the same memory page. Each of the queued strides is a difference between cache line offsets of memory addresses of respective adjacent load requests of the stream. The hardware data prefetcher also includes hardware logic. The hardware logic calculates a current stride between a current load request and a newest previous load request of the stream. The current stride is a difference between cache line offsets of the memory addresses of the current load request and the newest previous load request. The hardware logic compares the current stride and a stride M in the queue. The hardware logic compares the newest of the queued strides with a queued stride M+1. Stride M+1 is older than and adjacent to stride M in the queue. When the current stride matches stride M and the newest queued stride matches stride M+1, the hardware logic prefetches into the cache memory a cache line whose offset within the memory page is the sum of the offset of the current load request and a stride M−1. Stride M−1 is newer than and adjacent to stride M in the queue.

In another aspect, the present invention provides a method for prefetching data into a cache memory. The method includes queuing strides associated with a stream of temporally adjacent load requests from the same memory page into a hardware queue of indexed storage elements. Each of the queued strides is a difference between cache line offsets of memory addresses of respective adjacent load requests of the stream. The method also includes calculating a current stride between a current load request and a newest previous load request of the stream. The current stride is a difference between cache line offsets of the memory addresses of the current load request and the newest previous load request. The method includes comparing the current stride and a stride M in the queue and comparing the newest of the queued strides with a queued stride M+1, wherein stride M+1 is older than and adjacent to stride M in the queue. The method includes, when the current stride matches stride M and the newest queued stride matches stride M+1, prefetching into the cache memory a cache line whose offset within the memory page is the sum of the offset of the current load request and a stride M−1, wherein stride M−1 is newer than and adjacent to stride M in the queue.

In yet another aspect, the present invention provides a computer program product encoded in at least one computer readable storage medium for use with a computing device, the computer program product comprising computer readable program code embodied in said medium for specifying a hardware data prefetcher. The computer readable program code includes first program code for specifying a queue of indexed storage elements into which are queued strides associated with a stream of temporally adjacent load requests from the same memory page into wherein each of the queued strides is a difference between cache line offsets of memory addresses of respective adjacent load requests of the stream. The computer readable program code also includes second program code for specifying hardware logic that calculates a current stride between a current load request and a newest previous load request of the stream, wherein the current stride is a difference between cache line offsets of the memory addresses of the current load request and the newest previous load request. The hardware logic also compares the current stride and a stride M in the queue and compares the newest of the queued strides with a queued stride M+1, wherein stride M+1 is older than and adjacent to stride M in the queue. The hardware logic also, when the current stride matches stride M and the newest queued stride matches stride M+1, prefetches into the cache memory a cache line whose offset within the memory page is the sum of the offset of the current load request and a stride M−1, wherein stride M−1 is newer than and adjacent to stride M in the queue.

DETAILED DESCRIPTION OF THE INVENTION

Glossary

A stride is the difference between the cache line offset values of the memory addresses of temporally adjacent load requests from the same memory page seen by the data prefetcher. A stride can be positive or negative, depending on the direction of the temporally adjacent load requests.

Figure 2:
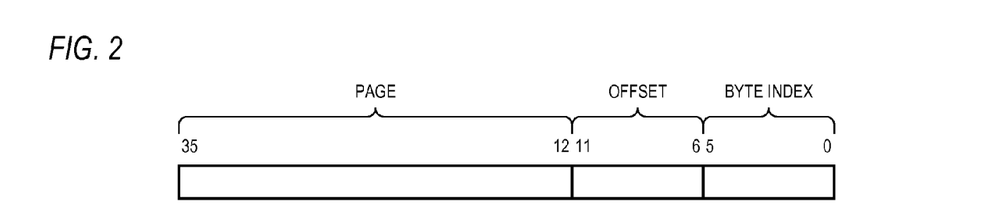
FIG. 2 is a block diagram illustrating an example memory address.

A cache line offset, or simply offset, is the value of the portion (i.e., subset of bits) of a memory address that specifies a cache line within a memory page. FIG. 2 illustrates an example of a memory address and its offset bits.

A load request implicates a cache line if the load request memory address is within the cache line memory address. For example, a load address of 12345678H implicates the cache line at memory address 12345640H.

Description of the Embodiments

Figure 1:
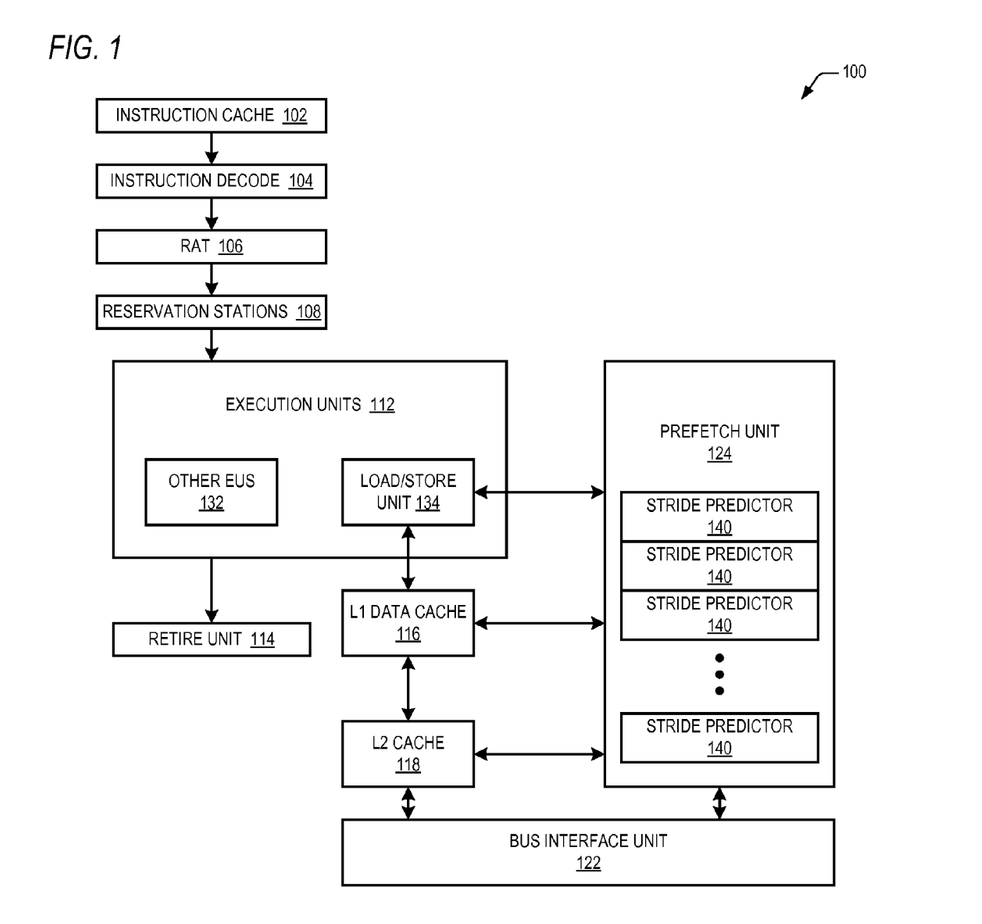
FIG. 1 is a block diagram illustrating a microprocessor according to the present invention.

Referring now to FIG. 1, a block diagram illustrating a microprocessor 100 according to the present invention is shown. The microprocessor 100 includes a pipeline of stages that includes various functional units. The pipeline includes an instruction cache 102, coupled to an instruction decoder 104, coupled to a register alias table (RAT) 106, coupled to reservation stations 108, coupled to execution units 112, coupled to a retire unit 114. In one embodiment, the instruction decoder 104 may include an instruction translator that translates macroinstructions (e.g., of the x86 architecture or the ARM architecture) into microinstructions of the microinstruction set of a RISC-like microarchitecture of the microprocessor 100. The reservation stations 108 issue instructions to the execution units 112 for execution out of program order. The retire unit 114 includes a reorder buffer that enforces retirement of instructions in program order. The execution units 112 include a load/store unit 134 and other execution units 132, such as integer units, floating-point units, branch units, or SIMD units. The load/store unit 134 reads data from a level-1 (L1) data cache 116 and the store unit 134 writes data to the L1 data cache 116. A level-2 (L2) cache 118 backs the L1 data cache 116 and the instruction cache 102. The L2 cache 118 reads and writes system memory via a bus interface unit 122 that interfaces the microprocessor 100 to a bus, such as a local bus or memory bus. The microprocessor 100 also includes a prefetch unit 124, coupled to the load/store unit 134, L1 data cache 116, L2 cache 118 and bus interface unit 122, which prefetches data from system memory into the L2 cache 118 and/or the L1 data cache 116 as described in detail herein. Prefetch unit 124 may also prefetch data from L2 cache 118 into L1 cache 116. The prefetch unit 124 includes a plurality of stride predictors 140, the number of which may vary in various embodiments, each of which maintains a stride history associated with a respective stream of load requests from a given memory page. This reduces the ability of streams from different pages of memory (which are likely to have different stride patterns) from interfering with each other.

Referring now to FIG. 2, a block diagram illustrating an example memory address is shown. For each of multiple pages of memory, a prefetch unit 124 of FIG. 1 monitors the history of accesses to the page and attempts to predict future memory addresses at which data will be accessed and prefetches the data from the predicted memory addresses into the L2 cache 118 and/or the L1 data cache 116 of FIG. 1. Preferably, the microprocessor 100 prefetches entire cache lines of data into the cache memory 118/116. In the example of FIG. 2, the size of a memory page is 4 KB, the size of a cache line is 64 bytes, and the memory address is 36-bits, which include a page number (bits 35:12), an offset of a cache line within the page (bits 11:6), and a byte index within the cache line (bits 5:0). In other embodiments, the memory address may be larger or smaller than 36 bits, and the page, cache line offset, and byte index fields may vary, also. Additionally, the size of a cache line may vary for different cache memories of the microprocessor 100.

In one embodiment, microprocessor 100 takes the cache line offset of a current load request address and subtracts from it the cache line offset of the newest previous load request address in order to determine a stride between the two memory accesses. Microprocessor 100 performs the stride calculation for a stream of temporally adjacent memory accesses to the same page of memory. Several consecutive strides make up a load stride pattern. Although the stride values may vary (e.g., +2, +4, +1, +3), the present inventors have observed that for some applications, the stride values may exhibit a pattern that repeats after varying numbers of strides. The stride predictors 140 of FIG. 1 detect load stride patterns in order to predict a next stride corresponding to a next data load request. Prefetch unit 124 may then prefetch data using the predicted next stride.

Figure 3:
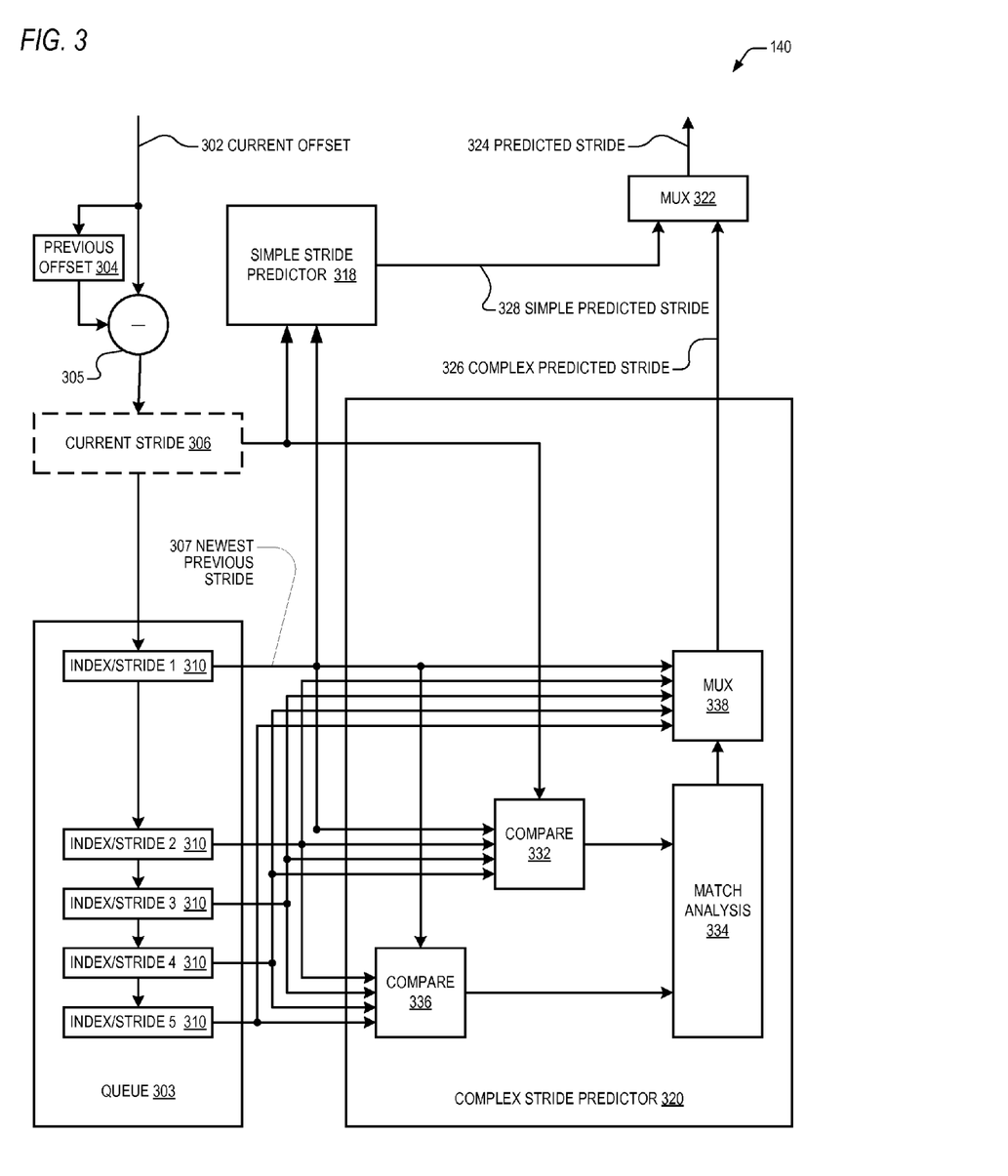
FIG. 3 is a block diagram illustrating a stride predictor of FIG. 1.

Referring now to FIG. 3, a block diagram illustrating a stride predictor 140 of FIG. 1 is shown. The stride predictor 140 includes a subtractor 305 that subtracts a previous offset provided by a register 304 to generate a current stride 306; a queue 303 of storage elements 310 for storing a history of strides; a simple stride predictor 318 that receives the current stride 306 and a newest previous stride 307, which is the stride stored in the element 310 at the tail of the queue 303, i.e., the stride most recently pushed into the queue 303; a complex stride predictor 320 coupled to the stride queue 303 and that also receives current stride 306; and a mux 322 that selects either a predicted stride 328 generated by the simple stride predictor 318 or a predicted stride 326 generated by the complex stride predictor 320 to output as a predicted stride 324. The current stride 306 may be merely provided as the output of the subtractor 305, or also stored in a storage element.

The current offset 302 is the cache line offset portion of a current load request. In one embodiment, the current load request is a load request made by the L1 data cache 116 to the L2 cache 118 for a cache line (e.g., because data included in the cache line was requested by the load/store unit 134 but the cache line was missing in the L1 data cache 116), and the stride predictor 140 snoops the load request for the cache line from the L1 data cache 116 to the L2 cache 118. In an alternate embodiment, the stride predictor 140 snoops the load requests made by the load/store unit 134 to the L1 data cache 116 and, based on the stride history associated with the stream, prefetches cache lines from the L2 cache 118 to the L1 data cache 116. It is noted that in this embodiment, the load requests may include temporally adjacent load requests that are much smaller than a cache line size and therefore may include multiple load requests to the same cache line. Therefore, in such an embodiment, the stride predictor 140 may include a filtering mechanism to filter load requests to the same cache line in close temporal proximity and treat them as a single load request of the cache line. In yet another alternate embodiment, the load/store unit 134 may make the load request to both the L1 data cache 116 and to the L2 cache 118 in parallel, and the stride predictor 140 may snoop the current load request. In yet another alternate embodiment, the stride predictor 140 may snoop the current load request made by the L2 cache 118 to a L3 cache (not shown) or other cache in the cache memory hierarchy of the microprocessor 100.

The value stored in the previous offset register 304, also referred to simply as the previous offset 304, is the offset of the newest load request previous to the current load request. The subtractor 305 subtracts the previous offset 304 from the current offset 302 to obtain the current stride 306. The stride predictor 140 stores the current offset 302 in the previous offset register 304 after subtracting the previous offset 304 from current offset 302. The queue 303 of storage elements 310 (e.g., registers or latches) holds a stride history associated with the stream of load requests whose offsets were previously received as current offset 302. The queue 303 of the embodiment of FIG. 3 includes five storage elements 310 denoted as indexes 1 through 5 to hold five previous strides. Each element 310 also includes a valid bit (not shown) that indicates whether the element is currently storing a valid stride. Each time the stride predictor 140 generates a complex predicted stride 326 in response to a new load request, the stride predictor 140 pushes the calculated current stride 306 into the queue 303 at index 1 and sets its valid bit. The other entries 310 of the queue 303 and their valid bit are accordingly pushed down the queue 303, and the stride in index 5 is pushed out of the queue 303. Thus, the element 310 at index 1 holds the newest previous stride 307, and the element 310 at index 5 holds the oldest previous stride.

In one embodiment, when "warming up," the stride predictor 140 has no valid previous strides in the queue 303, for example, on the first load request from a page of memory that has not been accessed relatively recently. Upon the first load request to a memory page, the prefetch unit 124 allocates a new stride predictor 140 for the page and invalidates all the entries 310 of the queue 303. Additionally, in one embodiment, when the queue 303 is full of valid strides and yet fails to match a stride pattern from the load request stream, the stride predictor 140 invalidates all the entries 310 of the queue 303, as described in more detail below. In one embodiment, in order to improve stride prediction, when the stride predictor 140 pushes the first valid stride into the queue 303 (i.e., into index 1), the stride predictor 140 seeds index 2 with the same first valid stride.

In one embodiment, the simple stride predictor 318 generates a simple predicted stride 328 based merely on the current stride 306 and newest previous stride 307. More specifically, if the current stride 306 matches the newest previous stride 307, then the simple stride predictor 318 predicts the next stride will be the current stride 306. In contrast, the complex stride predictor 320 generates a complex predicted stride 326 using the current stride 306 and the stride history stored in the queue 303, as described in more detail below. Preferably, if the complex stride predictor 320 indicates that it matched a stride pattern and makes a valid stride prediction, then the MUX 322 selects the complex predicted stride 326 from the complex stride predictor 320 to supply a predicted stride 324, and otherwise selects the simple predicted stride 328 from the simple stride predictor 318.

The complex stride predictor 320 includes two compare units 336 and 332 that receive the strides from the queue 303, match analysis logic 334 coupled to the compare units 336 and 332, and a MUX 338 coupled to the match analysis logic 334 and coupled to receive the strides from the queue 303. In one embodiment, compare unit 332 compares the current stride 306 with strides 1-4 of the queue 303 (i.e., with the strides held in the elements at indexes 1-4) and outputs the results to the match analysis logic 334; similarly, compare unit 336 compares the newest previous stride 307 with strides 2-5 and outputs the results to the match analysis logic 334. The match analysis block 334 examines the results to determine if the current stride 306 matches one of the queued strides (one of strides 1-4 in the embodiment of FIG. 3), referred to generically as stride M (i.e., the stride at index M in the queue 303), and to determine if the newest previous stride 307 matches the next oldest queued stride (i.e., the stride at index M+1). If so, the stride predictor 140 predicts the next newest queued stride (i.e., the stride at index M−1) indicates the stride from the current load request offset 302 to a cache line that will be subsequently requested by the stream of loads. Consequently, the match analysis logic 334 controls the MUX 338 to select stride M−1 as the complex predicted stride 326. This is also described with respect to FIG. 4. For example, if the current stride 306 matches stride 4 (M=4) and the newest previous stride 307 matches stride 5 (M+1=5), the match analysis block 334 controls MUX 338 to select stride 3 (M−1=3) as the predicted stride 326. In one embodiment, if the match analysis block 334 detects that the current stride 306 matches multiple queued strides, i.e., M has multiple values, and the newest previous stride 307 matches stride M+1 for the multiple M values, the match analysis logic 334 selects the stride M−1 with the lowest index as the predicted stride 326, although other embodiments are contemplated. Although FIG. 3 illustrates an embodiment in which all of the strides stored in the queue 303 are provided to the MUX 338, it is noted that strides 4 and 5 need not be provided to the MUX 338, which may simplify the MUX 338, since the match analysis logic 334 will not select either of these strides as the complex predicted stride 326. Furthermore, in general, as may be observed from the further description below, for a queue 303 having N entries 310 that is predicting a pattern with a maximum pattern length of L, the oldest L-1 strides in the queue 303 need not be provided, simplifying the MUX 338.

Figure 4:
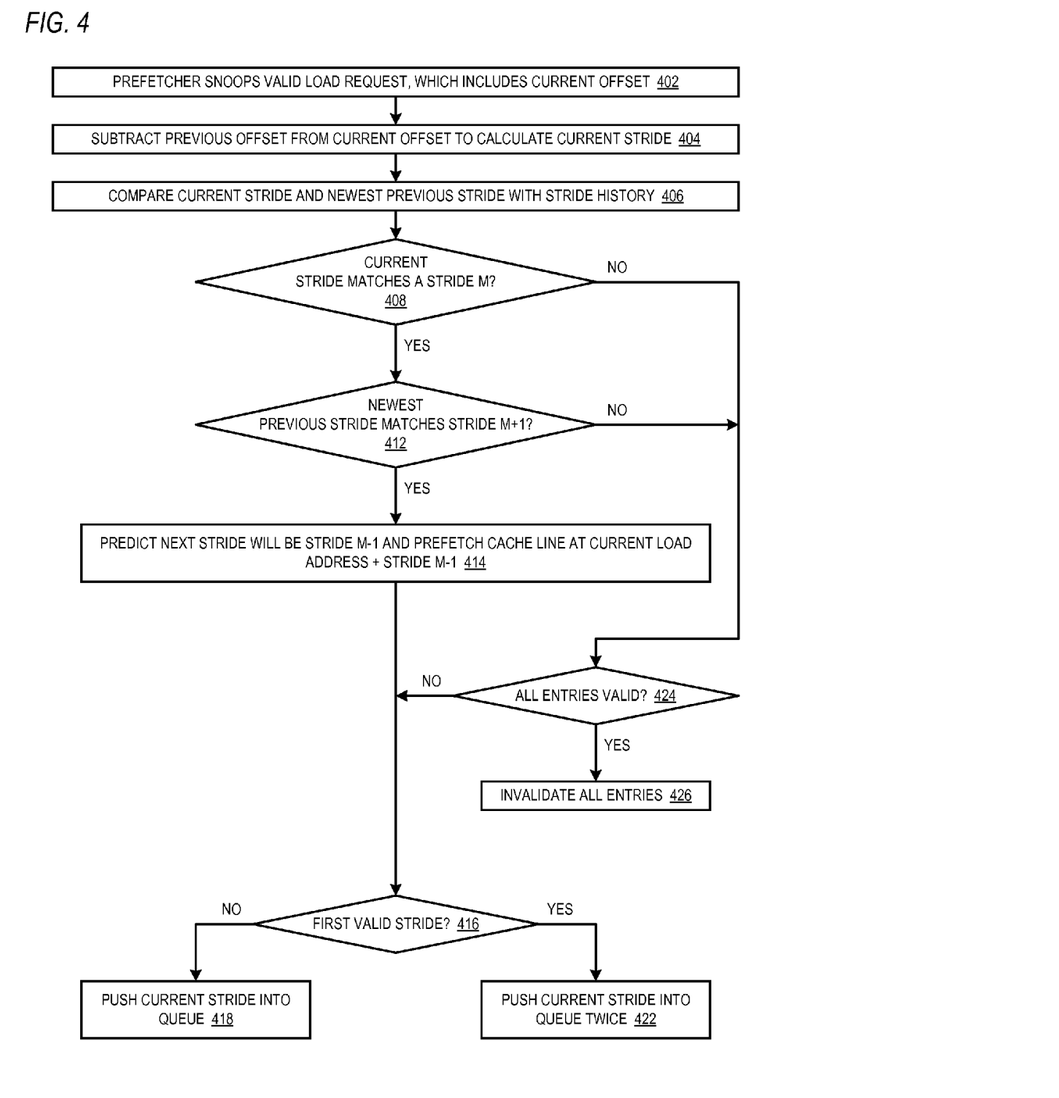
FIG. 4 is a flowchart illustrating operation of the prefetch unit of FIG. 1.

Referring now to FIG. 4, a flowchart illustrating operation of the prefetch unit 124 of FIG. 1 is shown. Flow begins at block 402.

At block 402, the prefetch unit 124 snoops a current load request having a current offset 302 of FIG. 3, which is the cache line offset portion of the current load request memory address. The page bits of the current load request memory address specify the memory page that includes the load request, and the prefetch unit 124 determines which, if any, of the stride predictors 140 (of the plurality of stride predictors 140 of FIG. 1) has been allocated to track the stride history of the memory page. If a stride predictor 140 has been allocated for the memory page, then the stride predictor 140 is activated to perform the remaining steps of FIG. 4. However, if there is not a stride predictor 140 allocated for the memory page, then the prefetch unit 124 allocates a stride predictor 140 for the new memory page—if all of the stride predictors 140 are already in use, preferably on a least-recently-used basis—and invalidates all of the entries of the queue 303 of FIG. 3 of the newly allocated stride predictor 140. In this case, no stride may be calculated because the stride predictor 140 has not seen any other recent load requests from the memory page, so the stride predictor 140 does not attempt to predict a next stride for prefetching purposes and the prefetch unit 124 may revert to the predicted stride 328 of the simple stride predictor 318, if appropriate. Otherwise, flow proceeds to block 404.

At block 404, the subtractor 305 subtracts the previous offset 304 of FIG. 3 from the current offset 302 to calculate the current stride 306. Flow proceeds to block 406.

At block 406, the compare blocks 336 and 332 of FIG. 3 compare the current stride 306 and newest previous stride 307 with the stride history stored in the queue 303 and provide the results to the match analysis logic 334, as described above. Flow proceeds to decision block 408.

At decision block 408, the match analysis logic 334 determines whether the current stride 306 matches a valid stride of the queue 303, which is referred to as stride M. If so, flow proceeds to decision block 412; otherwise, flow proceeds to decision block 424.

At decision block 412, the match analysis logic 334 determines whether the newest previous stride 307 matches a valid stride of the queue 303 that is older than the stride matched at block 408 (stride M) and is adjacent to it, which is referred to as stride M+1. If so, flow proceeds to block 414; otherwise, flow proceeds to decision block 424.

At block 414, the match analysis logic 334 controls the MUX 338 of FIG. 3 to select stride M+1 from the queue 303 for provision as the complex predicted stride 326 of FIG. 3. That is, the stride predictor 140 predicts the stride stored in the queue 303 entry at index M+1, when added to the current stride 306, will be the offset of a cache line that will be requested by the load request stream. In response, the prefetch unit 124 generates a request to the bus interface unit 122 of FIG. 1 to prefetch from the memory page into a cache memory 116/118 the cache line at the offset that is the sum of the current offset 302 and the predicted stride 326. Flow proceeds to decision block 416.

At block 416, the stride predictor 140 determines whether the current stride calculated at block 404 is the first valid stride to the memory page. If so, flow proceeds to block 422; otherwise, flow proceeds to block 418.

At block 418, the stride predictor 140 pushes the current stride 306 calculated at block 404 into the queue 303. Flow ends at block 418.

At block 422, the stride predictor 140 pushes the current stride 306 calculated at block 404 into the queue 303 twice as an optimization to seed the stride history. Flow ends at block 422.

At block 424, the stride predictor 140 determines whether all entries of the queue 303 are valid. If so, flow proceeds to block 426; otherwise, flow proceeds to decision block 416.

At block 426, according to one embodiment, the stride predictor 140 invalidates all the entries of the queue 303. This may increase the accuracy of the stride predictor 140 by preventing it from causing prefetches that may not be beneficial, e.g., that may pollute the cache 116/118. Flow ends at block 426.

As may be observed from the above, and as illustrated further below, an advantage of embodiments described is that the prefetch unit 124 may perform a beneficial cache line prefetch for a stream of load requests that exhibit a relatively long complex stride pattern, i.e., a sequence of strides in which the stride values vary. More specifically, if N is the number of entries (i.e., number of strides held) in the queue 303, the stride predictor 140 may detect a pattern with different periods, in particular, the period of the pattern may be up to as long as N−1.

Figure 5:
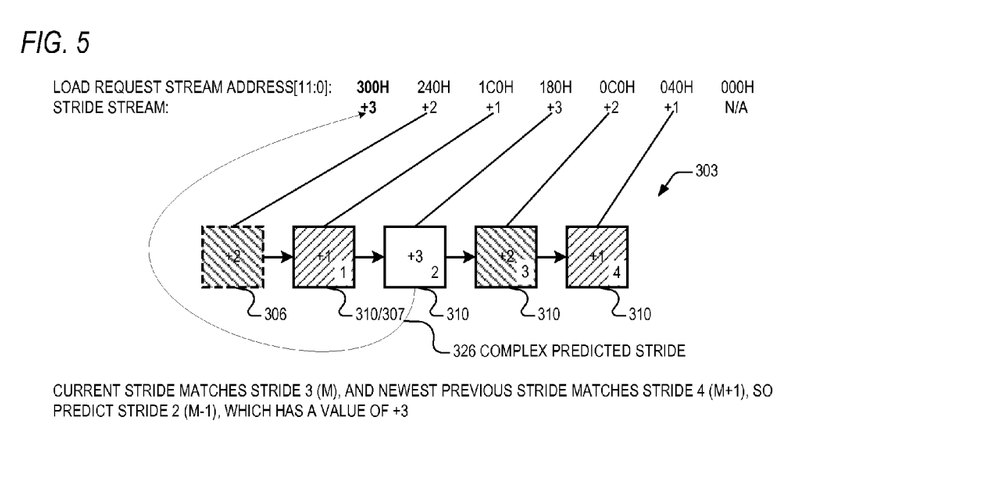
FIGS. 5 through 9 are block diagrams illustrating operation of the stride predictor of FIG. 3 by way of first, second, third, fourth, and fifth examples.

Referring now to FIG. 5, a block diagram illustrating operation according to FIG. 4 of the stride predictor 140 of FIG. 3 by way of example is shown. In the example of FIG. 5, the queue 303 of FIG. 3 has four storage elements 310— denoted as indexed elements 1, 2, 3, 4—for storing a four-stride history. The four strides stored in the correspondingly indexed storage elements 310 of the queue 303 are referred to below as stride 1, stride 2, stride 3, and stride 4.

An example stream of memory addresses of temporally adjacent load requests and the corresponding repeating load stride pattern {+1, +2, +3} generated from the load request stream is shown. As in FIG. 2, the offset is bits [11:6] of a memory address and bits [5:0] are the byte index. Only the lower 12 bits [11:0] are shown, and the page bits [35:12] are not shown for simplicity, since the loads access the same page of memory (i.e., the upper un-shown bits of the addresses specify the same page and have the same value). Below each load request address, the corresponding stride between that load request and its predecessor is shown (except for the first load request from the page since there is no predecessor from which to calculate a stride). The last load request shown in the stream and its associated stride are shown in bold to indicate that the stride predictor 140 has not yet seen them, but rather that the stride predictor 140 will predict them, as described below.

On a first load request from memory address 000H, there is no valid stride because there is no previous load request, which may be the case if the load from 000H is the first load from the memory page, for example. On a second load from 040H, the offset bits 000001b have a value that is one greater than the value of the previous offset bits 000000b, so the calculated stride is +1, according to block 404 of FIG. 4, which is pushed into the queue 303 twice according to block 422 of FIG. 4. On a third load from 0C0H, the offset 000011b is two greater than the previous offset 000001b, so the stride is +2, which is pushed into the queue 303 according to block 418 of FIG. 4. On a fourth load from 180H, the offset 000110b is three greater than the previous offset 000011b, so the stride is +3, which is pushed into the queue 303 according to block 418. On a fifth load from 1C0H, the offset 000111b is one greater than the previous offset 000110b, so the stride is +1, which is pushed into the queue 303 according to block 418. Thus, after the load request from memory address 1C0H has been processed by the stride predictor 140, the stride history of the first four strides has been captured within the queue 303 according to the operation of FIG. 4 such that its contents is: stride 4 is +1, stride 3 is +2, stride 2 is +3, and stride 1 is +1, which is the newest previous stride 307. The load request stream includes a sixth load from 240H, which is the current load request in the example of FIG. 5. The load request stream also includes a seventh load request from memory address 300H has not yet been made by the load/store unit 134 or cache 116/118, and has therefore not been seen by the stride predictor 140, for which reason the load request to 300H and its associated stride are shown in bold, as mentioned above.

When the stride predictor 140 sees the load request at 240H, the offset 001001b is two greater than the previous offset 000111b, so the subtractor 305 calculates the current stride 306 as +2 as shown, according to block 404 of FIG. 4. The compare logic 332 informs the match analysis logic 334 that the current stride 306 matches stride 3 (M=3) of the queue 303 according to block 408 of FIG. 4, and the compare logic 336 informs the match analysis logic 424 that the newest previous stride 307 matches stride 4 (M+1=4) of the queue 303 according to block 412 of FIG. 4, so the match analysis logic 424 controls MUX 338 to select stride 2 (M−1=2) of the queue 303 having the value +3 as the complex predicted stride 326 according to block 414 of FIG. 4. Additionally, the prefetch unit 124 adds the predicted stride 326 (selected my MUX 322 as predicted stride 324) value of +3 to the current load request offset 001001b (bits [11:6] of 240H) to produce a prefetch address of 300H (within the memory page associated with the stride predictor 140) from which the prefetch unit 124 requests the bus interface unit 122 to allocate a cache line into the cache memory 116/118 according to block 414. In this manner, the stride predictor 140 predicts the stride of +3 in response to the load request at memory address 240H in order to prefetch the cache line at memory address 300H into a cache memory 116/118 of the microprocessor 100, which may advantageously bring the cache line into the cache before the load request from 300H is made, in which case the load request will hit in the cache 116/118. This is advantageous since a cache miss would cause an access to system memory with a relatively long latency, which might cause under-utilization of the execution units 112 of the microprocessor 100 for lack of the load data.

Figure 6:
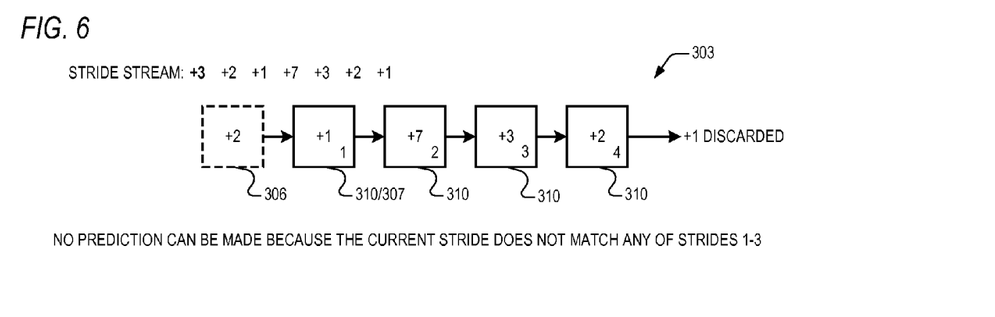

Referring now to FIG. 6, a block diagram illustrating operation according to FIG. 4 of the stride predictor 140 of FIG. 3 by way of a second example is shown. The stride stream of the example of FIG. 6 is +1, +2, +3, +7, +1, +2, +3, which is similar to that of example of FIG. 5, except that the stride stream of FIG. 6 includes a deviant stride of +7 in between the two instances of the {+1, +2, +3} stride pattern. Consequently, the current stride 306 does not match any of strides 1-3 and the newest previous stride 307 does not match any of strides 2-4; therefore, the stride predictor 140 is not capable of predicting a next stride.

Figure 7:
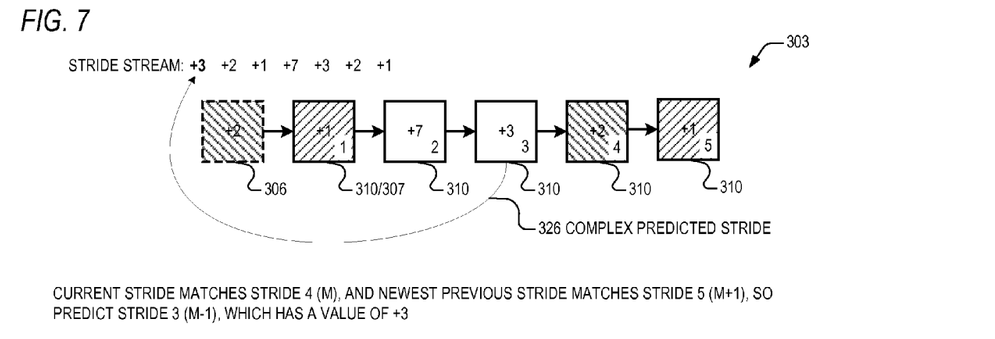

Referring now to FIG. 7, a block diagram illustrating operation according to FIG. 4 of the stride predictor 140 of FIG. 3 by way of a third example is shown. The stride stream of the example of FIG. 7 is that same as that of FIG. 6.

However, the alternate embodiment of the stride predictor 140 of FIG. 7 has a queue 303 with five storage elements 310 (i.e., it includes a fifth storage element 310 with index 5); consequently, the stride predictor 140 is capable of predicting the next stride of +3, even though the stride stream of FIG. 7 includes the deviant stride of +7 in between the two instances of the {+1, +2, +3} stride pattern. More specifically, the compare logic 332 informs the match analysis logic 334 that the current stride 306 matches stride 4 (M=4) and the compare logic 336 informs the match analysis logic 424 that the newest previous stride 307 matches stride 5 (M+1=5), so the match analysis logic 424 selects stride 3 (M−1=3) having the value +3 as the complex predicted stride 326.

As may be observed, an additional advantage of the longer queue 303 alternate embodiment of FIG. 7 is that it tolerates a deviation from, or perturbation in, the pattern. Generally speaking, for a queue 303 with N entries, the stride predictor 140 is able to detect a complex stride pattern having a period N−(P+1) that has P deviations from the pattern in between the end of one instance of the pattern and the beginning of a second instance of the pattern within the stream. Stated alternatively, the stride predictor 140 is capable of detecting a stride pattern that begins to repeat after a stride history of N—1 strides have been captured in the queue 303. This is particularly advantageous in a microprocessor 100 that is capable of performing load reordering, i.e., that may order loads out of program order, since deviations from a load request stream stride pattern may be introduced thereby.

Figure 8:
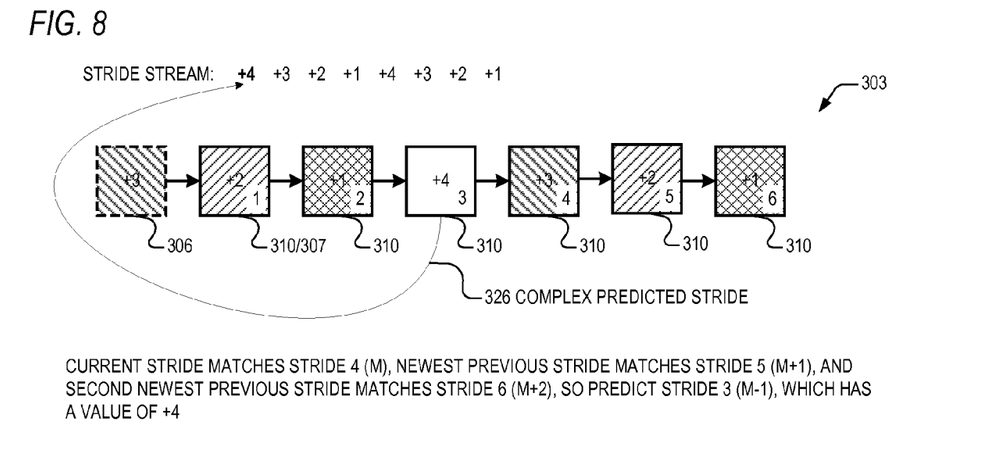

Referring now to FIG. 8, a block diagram illustrating operation of a stride predictor 140 according to an alternate embodiment by way of a fourth example is shown. The stride stream of the example of FIG. 8 is +1, +2, +3, +4, +1, +2, +3, +4, which is two instances of a {+1, +2, +3, +4} stride pattern. The alternate embodiment of the stride predictor 140 of FIG. 8 has a queue 303 with six storage elements 310 and is also different from the embodiments of FIGS. 5 through 7 because it makes three stride comparisons, rather than two, and makes a prediction only if all three comparisons indicate a match. That is, in addition to the compare logic 332 of FIG. 3 that compares the current stride 306 and the compare logic 336 of FIG. 3 that compares the newest previous stride 307, the stride predictor 140 according to the alternate embodiment of FIG. 8 includes third compare logic (not shown) that compares the second newest previous stride stored in the element 310 at index 2 of the queue 303 with the stride history and provides the match results to the match analysis logic 334, which predicts stride M−1 only if the current stride 306 matches stride M, the newest previous stride 307 matches stride M+1 and the second newest previous stride matches stride M+2. More specifically, as illustrated in the example of FIG. 8, the current stride 306 matches stride 4 (M=4) and the newest previous stride 307 matches stride 5 (M+1=5) and the second newest previous stride matches stride 6 (M+2=6), so the match analysis logic 424 selects stride 3 (M−1=3) having the value +4 as the complex predicted stride 326.

The additional stride comparison, such as included in the embodiment of FIG. 8, provides more precision in the stride pattern match and therefore potentially reduces the likelihood of prefetching a cache line that would pollute the cache memory 116/118. However, it should also be noted that the additional stride comparison potentially causes the prefetch unit 124 not to prefetch a beneficial cache line, particularly in the presence of a deviant stride. Furthermore, the additional stride comparisons may increase logic area and create timing problems.

Figure 9:
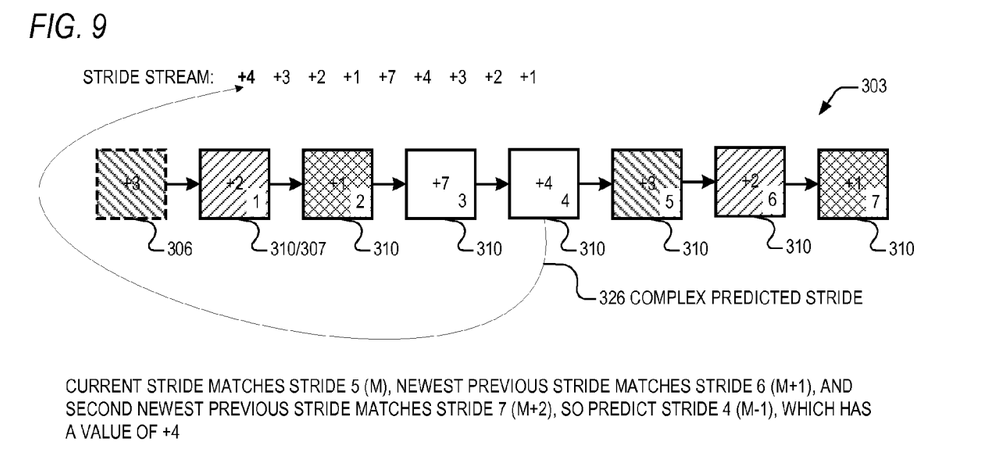

Referring now to FIG. 9, a block diagram illustrating operation of a stride predictor 140 according to an alternate embodiment by way of a fifth example is shown. The stride stream of the example of FIG. 9 is +1, +2, +3, +7, +1, +2, +3, which is similar to that of example of FIG. 8, except that the stride stream of FIG. 9 includes a deviant stride of +7 in between the two instances of the {+1, +2, +3, +4} stride pattern. However, the alternate embodiment of the stride predictor 140 of FIG. 9 has a queue 303 with seven storage elements 310; consequently, the stride predictor 140 is capable of predicting the next stride of +4, even though the stride stream of FIG. 9 includes the deviant stride of +7 in between the two instances of the {+1, +2, +3, +4} stride pattern, as shown. Advantageously, the embodiment of FIG. 9 includes the additional stride comparison characteristic of the embodiment of FIG. 8 and its potentially increased complex stride pattern detection accuracy, as well as the ability to tolerate a deviant stride in between two instances of a complex stride pattern and still detect the complex stride pattern and predict for prefetching purposes a next stride associated with the complex stride pattern.

It is also noted that the prefetch unit 124 that includes embodiments of the stride predictor 140 described is capable of prefetching at least some beneficial cache lines associated with a load request stream exhibiting a complex stride pattern even if the deviant stride or strides fall within the pattern rather than strictly between repeating instances of the pattern, although the number of prefetched beneficial cache lines and the number of needed cache lines not prefetched by the prefetch unit 124 varies depending upon the period of the pattern and the number of storage elements 310 in the queue 303.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a microprocessor core (e.g., embodied, or specified, in a HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device that may be used in a general-purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A hardware data prefetcher, comprising:
a queue of indexed storage elements, into which are queued strides associated with a stream of temporally adjacent load requests from the same memory page, wherein each of the queued strides is a difference between cache line offsets of memory addresses of respective adjacent load requests of the stream;
hardware logic, configured to:
calculate a current stride between a current load request and a newest previous load request of the stream, wherein the current stride is a difference between cache line offsets of the memory addresses of the current load request and the newest previous load request;
compare the current stride and a stride M in the queue;
compare the newest of the queued strides with a queued stride M+1, wherein stride M+1 is older than and adjacent to stride M in the queue;
when the current stride matches stride M and the newest queued stride matches stride M+1, prefetch into the cache memory a cache line whose offset within the memory page is the sum of the offset of the current load request and a stride M−1, wherein stride M−1 is newer than and adjacent to stride M in the queue.

2. The hardware data prefetcher of claim 1, further comprising a plurality of said queue and said hardware logic for prefetching into the cache memory cache lines for a plurality of memory pages concurrently.

3. The hardware data prefetcher of claim 1, wherein the queue comprises at least N of the indexed storage elements for queuing at least N strides, wherein N−1 is a period of a stride pattern of the stream of load requests, wherein the stride pattern may include strides all of different values, wherein N is at least four.

4. The hardware data prefetcher of claim 1, wherein the queue includes at least N of the indexed storage elements for storing at least N strides, wherein N−(P+1) is a period of a stride pattern of the stream of load requests, wherein the stride pattern may include strides all of different values, wherein P is a number of strides that deviate from the stride pattern, wherein P is at least one, wherein N is at least five.

5. The hardware data prefetcher of claim 1, wherein the current stride is pushed into the hardware queue of indexed storage elements and an oldest of the strides is pushed out of the queue.

6. The hardware data prefetcher of claim 1, wherein the hardware logic is configured to prefetch the cache line into the cache memory within a microprocessor from a system memory external to the microprocessor.

7. The hardware data prefetcher of claim 1, wherein the hardware logic is configured to prefetch the cache line into the cache memory within a microprocessor from a different cache memory within the microprocessor.

8. The hardware data prefetcher of claim 1, wherein the hardware logic is further configured to exclude zero-valued strides associated with the stream of temporally adjacent load requests.

9. The hardware data prefetcher of claim 1, wherein the hardware logic is further configured to:
mark all the storage elements of the hardware queue as invalid, in response to determining that all the storage elements are storing valid strides and yet the following condition does not exist: the current stride matches stride M and the newest queued stride matches stride M+1.

10. The hardware data prefetcher of claim 9, wherein the hardware logic is further configured to:
after marking all the storage elements of the hardware queue as invalid, queue the current stride into the first two storage elements of the hardware queue.

11. The hardware data prefetcher of claim 1, wherein the hardware logic is further configured to:
determine that the memory page specified by the current load request is a new memory page, and responsively queue the current stride into the first two storage elements of the hardware queue.

12. A method for prefetching data into a cache memory, the method comprising:
queuing strides associated with a stream of temporally adjacent load requests from the same memory page into a hardware queue of indexed storage elements, wherein each of the queued strides is a difference between cache line offsets of memory addresses of respective adjacent load requests of the stream;
calculating a current stride between a current load request and a newest previous load request of the stream, wherein the current stride is a difference between cache line offsets of the memory addresses of the current load request and the newest previous load request;
comparing the current stride and a stride M in the queue;
comparing the newest of the queued strides with a queued stride M+1, wherein stride M+1 is older than and adjacent to stride M in the queue;
when the current stride matches stride M and the newest queued stride matches stride M+1, prefetching into the cache memory a cache line whose offset within the memory page is the sum of the offset of the current load request and a stride M−1, wherein stride M−1 is newer than and adjacent to stride M in the queue.

13. The method of claim 12, further comprising:
performing said queuing, calculating, comparing, comparing, and prefetching for a plurality of memory pages concurrently.

14. The method of claim 12, wherein said queuing the strides comprises queuing at least N strides, wherein N−1 is a period of a stride pattern of the stream of load requests, wherein the stride pattern may include strides all of different values, wherein N is at least four.

15. The method of claim 12, wherein said queuing the strides comprises queuing at least N strides, wherein N−(P+1) is a period of a stride pattern of the stream of load requests, wherein the stride pattern may include strides all of different values, wherein P is a number of strides that deviate from the stride pattern, wherein P is at least one, wherein N is at least five.

16. The method of claim 12, wherein said queuing the strides comprises pushing the current stride into the hardware queue of indexed storage elements and pushing out of the queue an oldest of the strides.

17. The method of claim 12, wherein said prefetching into the cache memory a cache line comprises prefetching the cache line into the cache memory within a microprocessor from a system memory external to the microprocessor.

18. The method of claim 12, wherein said prefetching into the cache memory a cache line comprises prefetching the cache line into the cache memory within a microprocessor from a different cache memory within the microprocessor.

19. The method of claim 12, wherein said queuing the strides comprises excluding zero-valued strides associated with the stream of temporally adjacent load requests.

20. The method of claim 12, further comprising:
marking all the storage elements of the hardware queue as invalid, in response to determining that all the storage elements are storing valid strides and yet the following condition does not exist: the current stride matches stride M and the newest queued stride matches stride M+1.

21. The method of claim 20, further comprising:
after said marking all the storage elements of the hardware queue as invalid, queuing the current stride into the first two storage elements of the hardware queue.

22. The method of claim 12, further comprising:
prior to said queuing the strides, determining that the memory page specified by the current load request is a new memory page;
in response to said determining the memory page is a new memory page, queuing the current stride into the first two storage elements of the hardware queue.

23. A computer program product encoded in at least one non-transitory computer readable storage medium for use with a computing device, the computer program product comprising:
computer readable program code embodied in said medium, for specifying a hardware data prefetcher, the computer readable program code comprising:
first program code for specifying a queue of indexed storage elements, into which are queued strides associated with a stream of temporally adjacent load requests from the same memory page into wherein each of the queued strides is a difference between cache line offsets of memory addresses of respective adjacent load requests of the stream; and
second program code for specifying hardware logic, configured to:
calculate a current stride between a current load request and a newest previous load request of the stream, wherein the current stride is a difference between cache line offsets of the memory addresses of the current load request and the newest previous load request;
compare the current stride and a stride M in the queue;
compare the newest of the queued strides with a queued stride M+1, wherein stride M+1 is older than and adjacent to stride M in the queue;
when the current stride matches stride M and the newest queued stride matches stride M+1, prefetch into the cache memory a cache line whose offset within the memory page is the sum of the offset of the current load request and a stride M−1, wherein stride M−1 is newer than and adjacent to stride M in the queue.

24. The computer program product of claim 23, wherein the at least one computer readable storage medium is selected from the set of a disk, tape, or other magnetic, optical, or electronic storage medium and a network, wire line wireless or other communications medium.

\* \* \* \* \*